UNITED STATES PATENT OFFICE 2,274,566

GROUTING FOR EARTH'S STRATA

Francis D. Sullivan, Memphis, Tenn.

No Drawing. Application August 11, 1931,
Serial No. 556,466

15 Claims. (Cl. 106—83)

My invention relates to grouting for earth's stratas.

The essential objects of my invention are to provide, in a manner as hereinafter set forth a thoroughly efficient grouting for earth's stratas and its method of application for use in connection with the grouting or drilling of earth's crevices, laminations, fissures, cracks, water flows, caving or heaving of earth or shale in sand, gravel or other loose formations; for sealing or blocking off crevices, loose rock formations, etc.; for solidifying soil, for rock, etc., shafts or cofferdams; for walling up the hole or holding formations in oil, gas or other drilling operations in connection with muds; and to attain these ends in a strong, durable and comparatively inexpensive manner.

To the above ends essentially my invention consists of a grouting for earth's stratas and its method of application as will fall within the scope of the claims hereunto appended.

A grouting for earth's stratas in accordance with this invention consists of comminuted paper, emulsified asphalt, liquid rubber or tar or precipitating agent working in connection with silicate of soda; such as, calcium chloride, bi-carbonate of soda, aluminum sulphate, sodium chloride, lime or other alkalies either in powder or in solution of that type possessing a characteristic for reaction with silicate of soda, and with a solidifying agent, such as Portland or other hydraulic cement.

With respect to the application of the grouting a mixture of comminuted paper, water and silicate of soda is forced into the earth's strata, after which an agent possessing a characteristic to react with the silicate of soda is also forced into the earth's strata; such procedure would be carried out if the mixture consisted of comminuted paper, water, emulsified asphalt and silicate of soda; or if the mixture consisted of comminuted paper, water, hydraulic cement and silicate of soda or if the mixture consisted of comminuted paper, water, hydraulic cement, emulsified asphalt and silicate of soda. The basic constituents of the grouting being comminuted paper, water, silicate of soda and an agent possessing a characteristic to react with the silicate of soda. If the mixture forced into the earth's strata does not contain sufficient alkalies possessing a characteristic to react with the sodium silicate which can be shown by test beforehand, then sufficient alkalies possessing the characteristic referred to, such as soda, bi-carbonate of soda, calcium chloride or aluminum sulphate, etc., as already mentioned can be added to the mixture to accomplish the purpose.

The action of the comminuted paper is to cause a precipitation and swell and react with the other chemicals. Where used with mud and the like it fiberizes the mud and binds it together. Analine or other dyes can be used with the combinations to locate the formation in case test hole may be drilled to determine results. The use of Portland or other hydraulic cements with the comminuted paper and chemicals, enables the process to set up quicker and makes a more compact mass and makes it more water-tight. After fissures or any of the other formations mentioned are sealed off in this way the regular procedure is to grout by the injection of Portland cement and water.

The material can be forced into the earth with either air or water with a pumping process at either low or high pressure.

What I claim is:

1. A grouting for earth stratas comprising a pressure applied mass of comminuted paper, water, silica of soda and an agent possessing a characteristic for reaction with silica of soda when the mass is applied.

2. A grouting for earth's stratas comprising a pressure applied mass of comminuted paper, water, silicate of soda, an agent possessing a characteristic for reaction with silicate of soda when the mass is applied, emulsified asphalt to impart a water-proof quality, and hydraulic cement for solidifying the mass.

3. A sub-strata grouting for earth's stratas comprising a pressure applied mass of comminuted paper, water and an emulsified asphalt for imparting a waterproof characteristic.

4. A sub-strata grouting for earth's stratas comprising a pressure applied mass of comminuted paper, water and hydraulic cement for solidifying the mass.

5. A grouting for earth's stratas comprising a pressure applied mass including comminuted organic fibrous material, water, silicate of soda and an agent possessing a characteristic for reaction with the silicate of soda when the mass is applied.

6. A grouting for earth's stratas comprising a pressure applied mass of comminuted organic fibrous material, water, silicate of soda, an agent possessing a characteristic for coaction with the silicate of soda and an emulsified asphalt to impart a waterproof quality to the mass when applied.

7. A grouting for earth's stratas comprising a pressure applied mass of comminuted organic fibrous material, water, silicate of soda, an agent possessing a characteristic for coaction with the silicate of soda, emulsified asphalt to impart a waterproof quality to the mass when applied and a hydraulic cement for solidifying the mass when applied.

8. A sub-strata grouting for earth's stratas comprising a pressure applied mass including comminuted organic fibrous material, water, a waterproofing agent and a solidifying agent.

9. A sub-strata grouting for earth's stratas comprising a pressure applied mass including comminuted organic fibrous material, water and an emulsified asphalt for imparting a waterproof characteristic to the mass.

10. A grouting for earth's stratas comprising a pressure applied mass including comminuted organic fibrous material, water, silicate of soda, an agent possessing a characteristic for reaction with the silicate of soda when the mass is applied, an agent possessing a characteristic to waterproof the mass and an agent for solidifying the mass when applied.

11. A sub-strata grouting for earth's stratas comprising a pressure applied mass including comminuted organic fibrous material, an agent possessing a characteristic to waterproof the mass when applied and an agent possessing a characteristic to solidify the mass when applied.

12. A means for making impervious or fixing pervious or loose subsoil layers, such as sand soils, and other porous masses, which comprises the combination of an aqueous dispersion of a bituminous substance, and a comminuted organic fibrous mass.

13. A means for making impervious or fixing pervious or loose subsoil layers, such as sand soils, and other porous masses, which comprises the combination of an aqueous dispersion of a bituminous substance, and a means for causing coagulation of said substance after penetration into the soil or other mass to be fixed or solidified.

14. A means for making impervious or fixing pervious or loose subsoil layers, such as sand soils, and other porous masses, which comprises the combination of an aqueous dispersion of a bituminous substance, and a means for causing coagulation of said substance after penetration into the soil or other mass to be fixed or solidified, said means including Portland cement.

15. A grouting for earth's stratas comprising a mass of comminuted organic fibrous materials and water adapted for application by pressure.

FRANCIS D. SULLIVAN.